DEVICE AND PROCESS FOR AMPLIFYING AND STORING AN IMAGE
Filed May 6, 1968
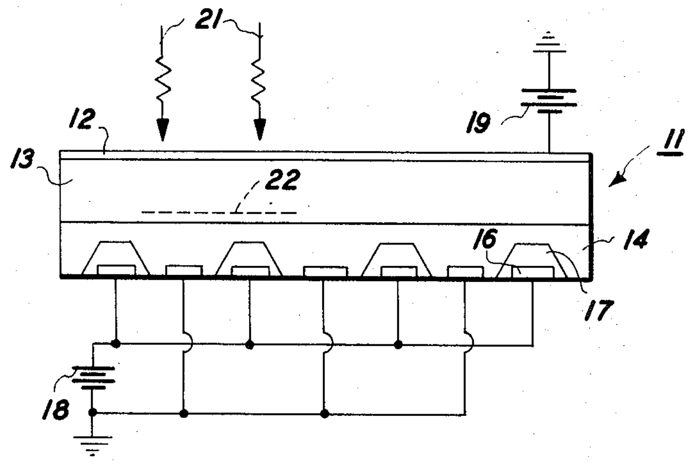
FIG. 1
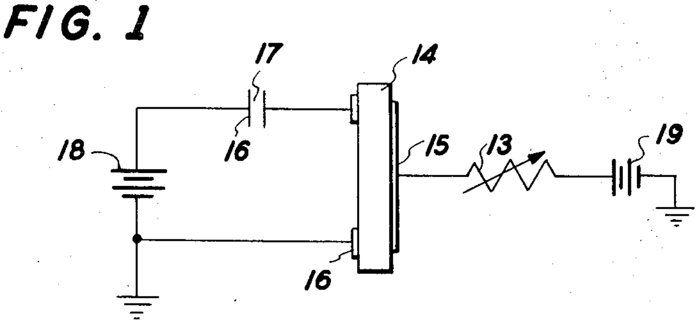
FIG. 2
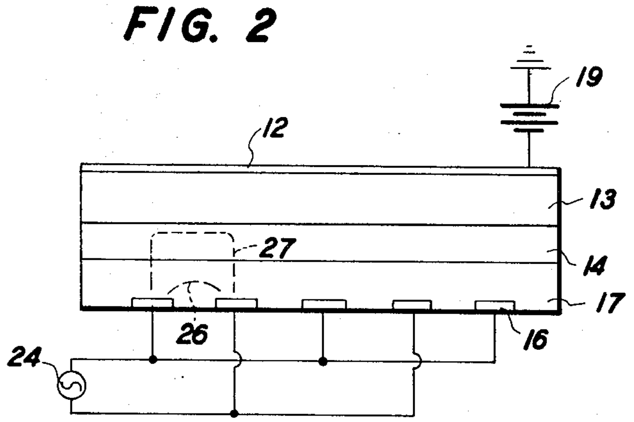
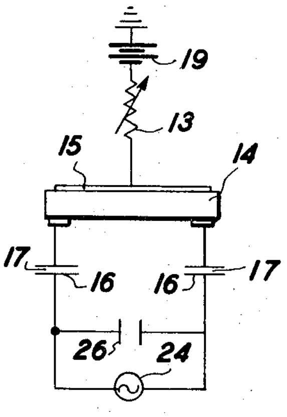
FIG. 3 FIG. 4
INVENTOR.
BENJAMIN KAZAN
BY Joseph Hirsch
Ronald Zibelli
ATTORNEYS United States Patent Office 3,543,032
Patented Nov. 24, 1970

3,543,032

DEVICE AND PROCESS FOR AMPLIFYING AND STORING AN IMAGE

Benjamin Kazan, Pasadena, Calif., assignor to Xerox Corporation, Rochester, N.Y., a corporation of New York Continuation-in-part of application Ser. No. 715,807, Mar. 25, 1968. This application May 6, 1968, Ser. No. 728,102
Int. Cl. H01l 17/00
U.S. Cl. 250—213 30 Claims

ABSTRACT OF THE DISCLOSURE

This application relates to an image intensifier having at least two energizing electrodes, and an electroluminescent phosphor layer and a field-effect semiconductor layer in series across said electrodes. A charge pattern applied to the field-effect semiconductor layer is employed to control the light output from the electroluminescent material. Techniques for imaging are also disclosed.

CROSS REFERENCE TO PARENT APPLICATION

This is a continuation-in-part application of Ser. No. 582,862 filed Sept. 29, 1966, and Ser. No. 715,807, now abandoned, filed Mar. 25, 1968, both applications being assigned to the same assignee.

BACKGROUND OF THE INVENTION

This invention relates to image intensifiers and more specifically solid state type image intensifiers capable of image storage.

Image intensifiers of the vacuum tube type have been known for many years now and have been the subject of intense research and development effort during this time. Consequently, they have reached a fairly advanced state of development and are practical for many uses. By comparison, solid state image intensifiers having first appeared in the mid-fifties, are in an earlier state of development and cannot yet be considered fully practical. In spite of their present short-comings, however, solid state image intensifiers have a great many potential advantages which could well make them superior to the vacuum tube type of intensifier in the long run. Whereas the vacuum tube type intensifier is fragile and even dangerous if broken, solid state panel image intensifiers can be made physically rugged and are safe to work with under any circumstances. In addition, the panel type image intensifier can be made in any size required whereas the vacuum tube type image intensifier is limited in size by the constraints of vacuum tube design and manufacture. In addition, the solid state image intensifiers can, in principle, be designed to respond to a much wider latitude of input wavelengths than can the vacuum type. The problem is, however, that frequently the degree of amplification, the storage capability, and the image quality of present day solid state image intensifiers is not close enough to that of the vacuum tube type of intensifier for designers to take advantage of the many other superior qualities of these solid state devices.

OBJECTS OF THE INVENTION

Accordingly, it is an object of this invention to provide a new solid state image intensifier which overcomes the deficiencies of prior art devices as described above.

It is a further object of this invention to provide a novel image intensifier with a high light amplification factor.

A still further object of the invention is to provide a novel image intensifier using a field effect semiconductor as a key element.

A still further object of the invention is to provide a new method of image intensification.

A further object of the invention is to provide a new image intensifier which is simple and inexpensive to construct.

SUMMARY OF THE INVENTION

These and still further objects of the invention are achieved generally speaking by using a radiation pattern to control the charge pattern on a field effect type semiconductor adjacent an electroluminescent material. By using this field effect semiconductor to form part of the electrical circuit with an electroluminescent material and a pair of exciting electrodes, the charge pattern which is itself varied in accordance with the light or other radiation input is employed to control the light output from the luminescent material. Generally, a photoconductive material is employed to control the charge pattern applied to the field effect semiconductor, however, in some instances where the photoconductor itself is a good field effect semiconductor material, the one material may be employed to perform both functions.

BRIEF DESCRIPTION OF THE DRAWINGS

In order that the invention may be more clearly understood, the following detailed description of two exemplary embodiments is made in connection with the drawings in which:

FIG. 1 is a side sectional view of one embodiment of the panel of the invention along with a diagrammatic showing of the circuit connections to the panel;

FIG. 2 is an equivalent circuit diagram of the panel of FIG. 1;

FIG. 3 is a side sectional view of the second embodiment of the panel and is also shown with circuit connections;

FIG. 4 is the equivalent circuit diagram of the panel of FIG. 3.

Referring now to FIG. 1, there is shown the image intensifying panel generally designated 11 which includes a thin optically transparent, electrically conductive layer 12 overlying a photoconductive insulating layer 13. The optically transparent electrically conductive layer 12 may comprise any one of a number of known materials having these capabilities such as thin layers of copper oxide, copper iodide, tin oxide, gold, or the like. Any suitable high resistivity type of photoconductive material may be used in layer 13 and may be deposited there either as a homogeneous layer of photoconductive material or as finely divided particles of photoconductive material dispersed in an electrically insulating film-forming binder. Various dopants, additives, sensitizers, and the like, known in the art of photoconductors may also be added to modify the sensitivity, spectral response or other properties of the photoconductor by techniques which are also known in the art. Typical photoconductors include sulfur, anthracene, selenium, arsenic-sulfide, antimony trisulfide, cadmium sulfide, cadmium selenide, cadmium sulfoselenide, lead oxide, lead sulfide, polyvinylcarbazole, phthalocyanine, quinacridones, zinc sulfide, etc.

The photoconductive insulating layer 13 should be thick enough to absorb a significant amount of the incident actinic electromagnetic radiation and to withstand the applied voltage. Accordingly, the photoconductor used is preferably one with a high dark resistivity having a thickness of from about 1 to about 100 microns and generally in the range of 25 to 50 microns.

Beneath photoconductive layer 13 is a field effect semiconducting layer 14 covering a series of very fine closely spaced parallel electrically separated conductors 16 which are embedded in the layer. The width and spacing of conductors 16 will, of course, determine the resolution of the system. However, by way of example, it is noted that electrodes 10 mils and 20 mils on centers (50% coverage) have been successfully used. Evaporated metal electrodes of only a few thousand angstroms thickness may be employed. Alternate ones of conductors 16 are covered with a body of a D.C. electroluminescent material. Any suitable D.C. electroluminescent phosphor may be employed. A typical D.C. phosphor made up of copper chloride and manganese activated zinc sulfide is described by Thornton in the Journal of Applied Physics, vol. 33, No. 10, pages 3045 et seq. The field effect semiconducting layer 14 may be described as a semiconducting resistor whose conductance is controlled by a transverse electric field that results from an applied voltage and may be of either n- or p-type material. Here again, any suitable field effect semiconducting material may be employed. Typical field effect semiconductors include silicon, germanium, cadmium sulfide, cadmium selenide, zinc oxide, etc.

If it is found that there is an exchange of charge between photoconductive layer 13 and field effect semiconductor 14, then a thin electrically insulating layer is provided therebetween. Such a layer may also be optically opaque so as to prevent the underlying electroluminescent material 17 from further exposing photoconductive layer 13 after the luminescent material has been excited. Of course, this may not be necessary if the photoconductive layer 13 is not responsive to radiation of the wavelengths emitted by the luminescent material.

Alternate ones of electrodes 16 are connected to the opposite sides of a D.C. potential source 18 of several hundred volts and transparent conductive layer 12 is connected to a second potential source 19 of about 100 volts D.C. These voltages may vary widely from the given values depending on materials used, thickness, brightness levels required, etc. Thus, when light or other radiation beams 21 from an image strike the plate penetrating transparent conductive layer 12 and rendering photoconductive layer 13 more conductive, charge is allowed to move down through the photoconductive layer 13 to the surface of layer 14 as shown at 22. Since light does not strike other portions of the panel which correspond with opaque areas of the projected image, the charge originating from potential source 19, does not penetrate the relatively insulating photoconductive layer 13 in these areas but is instead prevented from moving past conductive layer 12. The charge 22 which moves down through the photoconductive layer 13 is trapped at the interface between layers 13 and 14 and induces charge of opposite polarity in layer 14. It is assumed that the trapping of charge occurs at the surface of the semiconductor either due to a blocking layer on the surface or the presence of deep trapping states. If either of these conditions do not exist, it is desirable to add a thin insulating or high resistance layer between layers 13 and 14, in which case charges will be trapped at the interface between the insulator and the photoconductor. These trapped charges, as in the case of insulated-gate field-effect transistors, will induce charges of opposite polarity in the semiconductor 14. Assuming layer 14 is an n-type semiconductor and the charge 22 is negative, the resistance of the layer will be increased. Because of this increased resistance, current flow in those areas between adjacent electrodes 16 is decreased and the electroluminescent phosphor over adjacent ones of these electrodes does not glow. Since the voltage 18 applied across all of the alternate electrodes of 16 is sufficient to cause the electroluminescent phosphor to glow brightly in those areas of the panel where the resistance of the field effect semiconductor layer 14 has not been increased by the application of external charge, unexposed areas of the panel produce a bright glow and an output image which is a reversal of the input image is obtained.

By reversing the polarity of the DC voltage source 19 the polarity of charge 22 may be reversed. The charges 22 will now produce a local increase in the conductivity of layer 14 (still assuming an n-type semiconductor) and thereby result in a positive output light image from the panel. That is, in light exposed areas of the photoconductor, positive surface charge is allowed to migrate through to the interface between layers 13 and 14 and thereby cause a local increase in the conductivity of adjacent portions of layer 14. The increase in conductivity of portions of the field effect semiconductor layer will cause adjacent phosphor areas to glow more brightly. This results in a positive output image wherein light output corresponds to light exposed areas of the photoconductor.

In the methods described in the preceding two paragraphs, the polarity of the charge applied to the photoconductor surface for transfer to the interface of the field effect semiconductor will depend upon the type of charges preferentially conducted through the field effect semiconductor (i.e. whether it is an n-type or p-type semiconductor) and the type of imaging which is desired to be obtained. For positive imaging (i.e. where the output image has the same sense as the input image) the polarity of the charge applied to the photoconductor surface should be opposite to the polarity of the majority carriers present in the semiconductor. For reversal imaging, the polarity of the charge should be the same as the polarity of the majority carriers present in the semiconductor. The selection of an appropriate photoconductor capable of transferring charges of the desired polarity will also be necessary as should be apparent to one skilled in the art.

Since battery 19 constitutes an external power supply with a relatively unlimited source of charge, a large amplification effect may be produced with the panel. This may best be seen by considering the equivalent circuit as shown in FIG. 2. In this equivalent circuit which represents only a small portion of the panel overlying two adjacent electrodes 16, the power supply 18 is shown connected in series with a electroluminescent phosphor element having two plates with the plate furthest from the semiconductor layer 14 being one of the electrodes 16. Electroluminescent material 17 is incorporated as a dielectric between the two plates. This element is connected in series with power supply 18 and field effect semiconductor element 14 to complete the series circuit. The second electrode 16 is shown as a contact plate on the lower portion of semiconductor element 14. One side of voltage source 19 is connected in series through photoconductor 13 (which is represented as a variable resistor) to electrode 15 on the surface of field effect semiconductor 14. It is assumed here, as before, that either a thin insulating film is provided between electrode 15 and the semiconductor element 14, or that a blocking layer exists on the surface of the semiconductor below electrode 15 or charges are trapped in the surface layer of semiconductor 14. The similarity of the equivalent circuit to a vacuum tube triode amplifier is immediately apparent since power supply 19 applies charge to the surface of field effect semiconductor element 14 according to the light input to "variable resistor" 13 and element 14 acts in a manner analogous to the grid in a vacuum tube by decreasing the current flow in a related circuit when its own voltage is increased. On the other hand, where no charge is applied to the surface of element 14 because of a lack of light impinging on photoconductor 13, the current flow in the series circuit made up of elements 14 and 16 through 18 remains high and the electroluminescent material glows brightly.

In addition to the fact that the panel may be used to produce intense amplification effects, it is also very valuable for its ability to integrate a very weak light input signal over long periods and produce an even more intense output signal than would be produced by merely employing the amplification factor of the panel with a relatively short exposure. This effect is produced because as long as the light is kept on the photoconductor, current can continue to leak through it from conductive layer 12 to the interface between layers 13 and 14 and thus build up a large trapped charge with a strong field-effect action on semiconductor 14. The image may then be stored even after the light is removed by trapping of this charge at the interface. As is obvious from the circuit diagram, the panel may be readily erased by grounding conducting layer 12 or switching it to opposite polarity and flooding the panel with light so that the photoconductive layer is rendered conductive over its whole area. This procedure allows any charge trapped at the interface between the photoconductive layer and the field effect semiconducting layer to drain to ground or results in a uniform charge of appropriate polarity to be trapped at the interface.

In FIG. 3, there is shown a second embodiment of the invention in which the like elements bear like reference numerals. As in the case of FIGS. 1 and 2, a thin insulating or high resistance layer may be inserted between layers 13 and 14. The major differences between the panels of FIGS. 1 and 3 are that the FIG. 3 panel employs an A.C. power supply 24 and that the electroluminescent layer 17 uniformly covers all of electrodes 16 in one continuous layer. The power supply 24 may conveniently be 300 volts at 1000 cycles per second. Any suitable A.C. electroluminescent phosphor may be employed as layer 17. A typical phosphor of this type is copper chloride activated zinc sulfide. The equivalent circuit of FIG. 4 is also virtually identical with the equivalent circuit of FIG. 2 except for the fact that a capacitor (phosphor element) is used in series with both the drain and source electrodes of the field effect layer 14. Since the field effect amplifier in the form shown is essentially symmetrical with respect to the drain and source electrodes, it is possible to use the gate potential to control the A.C. impedance of the amplifier. The use of the two phosphor elements as opposed to the one used in the FIG. 1 embodiment of the invention has the advantage that in an actual image device a thin continuous film of phosphor with a higher resolution is used in place of the discrete elements or strips of phosphor. Since a continuous film of phosphor is used a second capacitor 26 is shown in the equivalent circuit representing the current flow path indicated at 26 in FIG. 3 from two adjacent electrodes directly through the phosphor layer while the flow path 27 shown in FIG. 3 is used to represent the series circuit from the power supply 24 through the two capacitors 17 and the field effect transistor 14. By keeping impedance 26 very high and/or by maintaining this impedance at a moderately high level and then deactivating the phosphor (or depositing an inert material) immediately between adjacent electrodes, the effect of introducing capacitor 26 into the circuit is minimal. In order to avoid any low impedance path through conductive layer 12 of FIG. 3 which could shunt the A.C. current 27, it may be desirable to separate electrode 19 from the panel after exposure or replace it with a corona discharge generator which applied charge to the free surface of the photoconductor. Alternatively, photoconductor 13 may be increased in thickness to reduce the shunting effect of conductor 12.

In the construction of the panel described above, the impedance of capacitor 26 is high enough so that it may be considered as a stray capacitance and may even be eliminated from the equivalent circuit diagram when ordinary frequencies of about 1000 cycles are used to activate the phosphor layer. This stray impedance is high because the capacitance of capacitor 26 is very small as compared with that of the capacitors shown at 16 and 17 in the equivalent circuit diagram. This is so because the spacing between adjacent electrodes 16 in the panel is roughly 10 mils while the thickness of the electroluminescent layer 17 above electrodes 16 is only about 1 mil. Since the capacitance of a capacitor increases as the spacing between the electrodes of the capacitor is decreased and since the A.C. impedance of a capacitor circuit decreases as the capacitance increases, the impedance of the series circuit through the two capacitors shown as 16 and 17 in FIG. 4 is much lower than the impedance through straight capacitor 26.

The panel of this embodiment in the invention can also be used for integration purposes and may be erased by the same procedure described above in connection with the FIG. 1 embodiment.

It is to be noted that if charge of the same polarity as the polarity of charges preferentially conducted through the semiconductor is supplied from potential source 19 to the photoconductor 13 in either embodiment of the invention, light exposure in imagewise configuration will allow charges in exposed areas to move down to the interface between layers 13 and 14 thereby resulting in a decrease in the conductivity of adjacent portions of the field effect semiconductor layer. The reduced conductivity areas of the field effect semiconductor cause light output to be either diminished or quenched from adjacent phosphor areas. This results in an output image having a different sense from the input image (i.e., a reversal image).

If, on the other hand, a charge of the opposite polarity to the polarity of charges preferentially conducted through the semiconductor layer is supplied from potential source 19 to photoconductor 13, the imagewise exposure and charge transfer will increase the conductivity of adjacent portions of the field effect semiconductor layer thereby causing adjacent phosphor areas beneath exposed areas to glow more brightly.

In either type of imaging, the interface between layers 13 and 14 may be precharged uniformly so that the panel output is initially uniformly dark or uniformly bright as desired, depending upon the polarity of the image to be stored. Precharging may be accomplished by uniformly flooding the photoconductor 13 with light while applying an appropriate potential to electrode 12. Such precharging may also be considered a form of erasure in that it causes a uniform output light of the desired level over the entire panel output irrespective of the previously stored image.

It can thus be seen that the "sense" or polarity of the optical image produced by the system may either be the same as the input optical image or reversed from the input image depending on the polarity of supply 13. It should also be noted that although the FIG. 1 embodiment of the invention has been shown using D.C. excitation of the phosphor that this embodiment could equally well be constructed with A.C. phosphors and operated with an A.C. excitation source similar to that described in connection with FIG. 2. The FIG. 3 embodiment may also be constructed with a D.C. phosphor providing its resistance is not too low and the phosphor layer is thin.

As explained above, erasure of the panel may be achieved by flooding the photoconductor uniformly with actinic light and grounding electrode 12 so that all charge at the interface of photoconductive layer 13 and field effect semiconductor layer 14 is drained to ground. This will cause the panel to emit light uniformly over its whole surface or in the event that the activating voltage across electrodes 16 is insufficient to excite the phosphor and the charges ordinarily used to lower the resistivity of the field effect semiconducting layer so that the phosphor will glow, erasure will cause the panel to go uniformly dark over its whole surface. Erasure may be accelerated if the polarity of the applied potential is reversed during light flooding instead of merely grounding electrode 12. This will produce a bias charge of reverse polarity at the interface of layers 13 and 14. When polarity is again reversed and image exposure is carried out the system may also have greater photographic speed, since the charge of one polarity at the interface will attract charge of the other polarity coming from the upper electrode on exposure.

In another technique voltage is applied from potential source 19, the photoconductor is flooded uniformly with actinic radiation and then the radiation is shut off to trap charge at the interface of the photoconductor and field effect semiconductor 14. Imaging may then be carried out by merely grounding electrode 12 during exposure.

The panel of this invention may be used in conjunction with images of any suitable type of activating electromagnetic radiation to which the photoconductive element of the panel is responsive. These may, for example, include X-ray, infrared, ultraviolet and visible light.

It is to be understood that the above described embodiments of the invention are only exemplary of the many forms which the device may take and that this description in no way constitutes a limitation on the scope thereof.

After a stored image is produced, selective areas of the image can be erased by applying appropriate polarity potential to the transparent control electrode while illuminating the particular areas of the photoconductor where erasure is desired. Thus, where the stored image is produced with the control electrode maintained under positive polarity, selective areas of the image can be erased by applying a negative potential to the electrode while illuminating only those areas of the photoconductor where illuminating only those areas of the photoconductor where erasure is desired to sensitizing electromagnetic radiation. This results in an elimination of the control charge at the interface between layers 13 and 14 thereby effectuating selective erasure. Similar erasure is obtained by applying positive potential to the control electrode during selective illumination when the stored image was produced using negative polarity.

When the field effect semiconductor has photoconductive properties, such as is the case with zinc oxide, and has a dominant spectral response in a different portion of the electromagnetic spectrum than the adjacent photoconductor layer, image storage and erasure can be achieved by the selective exposure of these layers to sensitizing radiation. Consider, for example, a panel structure having a zinc oxide field effect semiconductor layer (which is sensitive to violet light but substantially insensitive to yellow light) adjacent an organic photoconductor layer (which is sensitive to yellow light but substantially insensitive to violet light). Initially, the photoconductor can be flooded with yellow light while applying a negative potential thereto to uniformly darken the entire area of the panel (since zinc oxide is an n-type semiconductor) corresponding to the configuration of the transparent control electrode. After removal of this negative potential from the photoconductor, an input image of violet light can be projected onto the zinc oxide field effect semiconductor layer to discharge a portion of the stored charge adjacent the semiconductor-photoconductor interface thereby producing a stored, positive output image. To erase a portion of this stored image, a negative potential is applied to the transparent control electrode and that portion of the photoconductor above that portion of the stored image which is to be erased is illuminated with yellow light. Thus, selective erasure is achieved without disturbing other portions of the stored image, or portions of the image can be modified without complete erasure. This technique is applicable to other field effect semiconductors and other photoconductors if properly selected to provide dominant spectral responses in different portions of the electromagnetic spectrum.

A negative or reversal image from the input image can be obtained by initially flooding the panel with violet light to increase the conductivity of the zinc oxide field effect semiconductor and thereby brighten the entire panel. Thereafter, a negative potential is applied to the transparent control electrode while an image of yellow symbols on a dark background is projected onto the photoconductor, the yellow symbols comprising radiation to which the photoconductor is sensitive but to which the zinc oxide field effect semiconductor is sensitive. Transfer of the charges from the transparent electrode to adjacent the interface between the zinc oxide layer and the photoconductor layer in exposed areas darkens adjacent areas of the phosphor whereby an output image consisting of dark numerals against a white background is obtained. This output image corresponds to a negative or a reversal of the input image.

To achieve maximum contrast between the image and non-image areas, the magnitude of the potential applied to electrode 16 is chosen so that, after imagewise exposure, portions of the panel will be glowing brightly while other portions are completely darkened. For instance, when the potential applied to the electrodes is insufficient to cause adjacent electroluminescent material to glow when the field effect semiconductor layer is unmodified by charge transfer, imagewise exposure of the photoconductor layer and application of a potential to the control electrode of a polarity opposite to the polarity of the majority carriers present in the semiconductor will increase the local conductivity of the semiconductor layer beneath exposed areas whereby, if the conductivity is increased sufficiently, adjacent electroluminescent phosphor material will glow brightly. Conversely, with an initially applied potential which is sufficient to cause luminescence of adjacent phosphor material when the field effect semiconductor material is unmodified by charge transfer, imagewise exposure of the photoconductor layer and application of a potential to the control electrode of the same polarity as the polarity of the majority charges present in the semiconductor will decrease the local conductivity of the field effect semiconductor layer beneath exposed areas whereby, if the conductivity is diminshed sufficiently, adjacent phosphor material will become darkened. It is under these circumstances that maximum contrast between image and non-image areas is obtained. However, if desired, the panel can be operated so that certain portions thereof can be made to glow more brightly than other portions which are also glowing, or to cause certain portions of the panel to become only slightly darkened from an initially more brightly glowing state.

The panel of this invention may be used in conjunction with images of any suitable type of activating electromagnetic radiation to which the photoconductive element of the panel is responsive. These may, for example, include X-ray, infrared, ultraviolet and visible light.

It is to be understood that the above described embodiments of the invention are only exemplary of the many forms which the device may take and that this description in no way constitutes a limitation on the scope thereof.

What is claimed is:

1. A radiant energy amplifier and storage device comprising a plurality of closely spaced energizing electrodes with alternate ones of said energizing electrodes being mutually electrically insulated from each other and adapted for connection to opposite sides of an energizing power supply, electroluminescent phosphor material overlying at least alternate ones of said energizing electrodes, a field-effect semiconductor layer overlying said phosphor material, a photoconductive insulating layer overlying said field-effect semiconductor layer, an optically transparent control electrode completely overlying the exposed surface of said photoconductive insulating layer disposed opposite the interface adjacent said photoconductive insulating layer and said field-effect semiconductor layer, said control electrode being adapted for connection to a potential source, whereby upon application of potential to said control electrode and exposure of said photoconductive insulating layer to an actinic electromagnetic radiation pattern an electrostatic charge pattern is generated contiguous to said interface adjacent said field-effect semiconductor layer and said photoconductive insulating layer, said charge pattern controlling the flow of current between adjacent energizing electrodes when said energizing electrodes are connected to said power supply, whereby an amplified output image corresponding to said radiation pattern can be stored on said device in the absence of continued exposure of said photoconductive insulating layer to said radiation pattern.

2. The device of claim 1 further including a power supply, a potential source and means to expose said photoconductive insulating layer to an actinic electromagnetic radiation pattern.

3. The device of claim 1 further including a thin electrically insulating layer between field-effect semiconductor layer and said photoconductive insulating layer.

4. The device of claim 3 wherein said thin electrically insulating layer is optically opaque.

5. The device of claim 1 where said energizing electrodes are imbedded in said phosphor material and electrically separated from each other by at least a portion of said phosphor material.

6. The device of claim 1 wherein said electroluminescent phosphor material is a D.C. phosphor.

7. The device of claim 6 further including a D.C. power supply to which said energizing electrodes are connected.

8. The device of claim 1 wherein said electroluminescent phosphor material is A.C. phosphor.

9. The device of claim 8 further including an A.C. power supply to which said energizing electrodes are connected.

10. A radiant energy amplifier and storage device comprising a plurality of closely spaced energizing electrodes with alternate ones of said energizing electrodes being mutually electrically insulated from each other and adapted for connection to opposite sides of an energizing power supply, electroluminescent phosphor material overlying alternate ones of said energizing electrodes, said energizing electrodes being electrically separated from each other by at least a portion of said phosphor material, a field-effect semiconductor layer overlying said phosphor material, a photoconductive insulating layer overlying said field-effect semiconductor layer, an optically transparent control electrode completely overlying the exposed surface of said photoconductive insulating layer disposed opposite the interface adjacent said photoconductive insulating layer and said field-effect semiconductor layer, said control electrode being adapted for connected to a potential source, whereby upon application of potential to said control electrode and exposure of said photoconductive insulating layer to an actinic electromagnetic radiation pattern an electrostatic charge pattern is generated contiguous to said interface adjacent said field-effect semiconductor layer and said photoconductive insulating layer, said charge pattern controlling the flow of current between adjacent energizing electrodes when said energizing electrodes are connected to said power supply, whereby an amplified output image corresponding to said radiation pattern can be stored on said device in the absence of continued exposure of said photoconductive insulating layer to said radiation pattern.

11. The device of claim 10 wherein said electroluminescent phosphor material is a D.C. phosphor.

12. The device of claim 11 further including a D.C. power supply to which said energizing electrodes are connected.

13. A radiant energy amplifier and storage device comprising a plurality of closely spaced energizing electrodes with alternate ones of said energizing electrodes being mutually electrically insulated from each other and adapted for connection to opposite sides on an energizing power supply, a layer of electroluminescent phosphor material overlying said electrodes, a field-effect semiconductor layer overlying said phosphor material, a photoconductive insulating layer overlying said field-effect semiconductor layer, an optically transparent control electrode completely overlying the exposed surface of said photoconductive insulating layer disposed opposite the interface adjacent said photoconductive insulating layer and said field-effect semiconductor layer, said control electrode being adapted for connection to a potential source, whereby upon application of potential to said control electrode and exposure of said photoconductive insulating layer to an actinic electromagnetic radiation pattern an electrostatic charge pattern is generated contiguous to said interface adjacent said field-effect semiconductor layer and said photoconductive insulating layer, said charge pattern controlling the flow of current betwen adjacent energizing electrodes when said energizing electrodes are connected to said power supply, whereby an amplified output image corresponding to said radiation pattern can be stored on said device in the absence of continued exposure of said photoconductive insulating layer to said radiation pattern.

14. The device of claim 13 wherein said electroluminescent phosphor material is an A.C. phosphor.

15. The device of claim 14 further including an A.C. power supply to which said energizing electrodes are connected.

16. A method of imaging comprising providing the device of claim 1, applying a potential to said energizing electrodes, applying a potential to said unitary control electrode of polarity which is opposite to the polarity of charges preferentially conducted through said field effect semiconductor layer and exposing said photoconductive insulating layer to an actinic radiation image pattern whereby charge is transferred in exposed areas through said said photoconductive insulating layer to adjacent the interface between said photoconductive insulating layer and said field effect semiconductor whereby the conductivity of adjacent portions of said field effect semiconductor layer is increased sufficiently to cause adjacent portions of said electroluminescent phosphor material to glow or glow more brightly whereby an output image having the same sense as the input image is obtained

17. The method of claim 16 wherein said potential applied to said energizing electrodes is initially insufficient to cause excitation of said adjacent electroluminescent phosphor material when said field effect semiconductor material is unmodified by electrostatic charge adjacent its interface with said photoconductive insulating layer.

18. The method of claim 16 wherein said exposure of said photoconductive insulating layer to said pattern of actinic radiation is terminated but said output image remains for a period of time thereafter.

19. A method of imaging comprising providing the device of claim 1, applying a potential to said energizing electrodes which is sufficient to cause luminescence of adjacent electroluminescent phosphor material when said field effect semiconductor material is unmodified by electrostatic charge adjacent its interface with said photoconductive insulating layer, applying a potential to said unitary control electrode which is of the same polarity as the polarity of charges preferentially conducted through said field effect semiconductor layer, exposing said photoconductive insulating layer to an image pattern of actinic radiation whereby charge is transferred in exposed areas through said photoconductive insulating layer to adjacent the interface between said field effect semiconductor layer and said photoconductive insulating layer whereby the local conductivity of adjacent portions of field effect semiconductor layer is lessened sufficiently to diminish excitation of adjacent electroluminescent phosphor material whereby an output image having the opposite sense of said input image is obtained.

20. The method of claim 19 wherein the excitation of the adjacent electroluminescent material is completely diminished.

21. The method of claim 19 wherein said exposure of said photoconductive insulating layer to said pattern of actinic radiation is terminated but said output image remains for a period of time thereafter.

22. A method of imaging comprising providing the device of claim 1 wherein said field effect semiconductor has photoconductive properties and said field effect semiconductor and said photoconductive insulator have dominant spectral responses in different portions of the electromagnetic spectrum, applying a potential to said energizing electrodes, applying a potential to said control electrode of a polarity which is opposite to the polarity of charges preferentially conducted through said field effect semiconductor layer, uniformly exposing said photoconductive insulating layer to actinic radiation whereby charge transferred through said photoconductive insulating layer to adjacent said interface causes said electroluminescent material to glow or glow more brightly, and exposing said field effect semiconductor layer to an image pattern of actinic radiation to thereby cause adjacent portions of said electroluminescent material to glow less brightly whereby an output image having the opposite sense of said input image is obtained.

23. The method of claim 22 wherein said potential applied to said energizing electrodes is initially insufficient to cause excitation of said adjacent electroluminescent phosphor material when said field effect semiconductor material is unmodified by electrostatic charge transfer adjacent its interface with said photoconductive insulating layer.

24. The method of claim 22 wherein said exposure of said field effect semiconductor to an image pattern of actinic radiation causes said adjacent portions of said electroluminescent material to completely darken.

25. The method of claim 22 further including the step of applying the same polarity potential to said control electrode as previously applied and exposing only a portion of said photoconductive insulating layer above less brightly glowing portions of said electroluminescent material to actinic radiation whereby said output image is modified.

26. The method of claim 22 further including the step of applying the same polarity potential to said control electrode as previously applied and exposing only a portion of said photoconductive insulating layer above less brightly glowing portions of said electroluminescent material to actinic radiation whereby charge is transferred through said photoconductive insulating layer to adjacent said interface thereby selectively erasing that portion of said less brightly glowing output image beneath exposed areas of said photoconductive insulating layer.

27. A method of imaging comprising providing the device of claim 1 wherein said field effect semiconductor has photoconductive properties and said field effect semiconductor and said photoconductive insulator have dominant spectral responses in different portions of the electromagnetic spectrum, applying a potential to said energizing electrode which is sufficient to cause excitation of said adjacent electroluminescent phosphor material when said field effect semiconductor material is unmodified by electrostatic charge adjacent its interface with said photoconductive insulating layer, applying a potential to said unitary control electrode which is of the same polarity as the polarity of charges preferentially conducted through said field effect semiconductor layer, uniformly exposing said photoconductive insulating layer to actinic radiation whereby charge transferred through said photoconductive insulating layer to adjacent said interface lessens the local conductivity of said field effect semiconductor layer sufficiently to diminish excitation of adjacent electroluminescent phosphor material, and exposing said field effect semiconductor layer to an image pattern of actinic radiation to thereby cause portions of said electroluminescent material adjacent exposed portions of said field effect semiconductor material to glow or glow more brightly whereby an output image having the same sense as said input image is obtained.

28. The method of claim 27 wherein said uniform exposure causes complete termination of light output from said electroluminescent phosphor material.

29. The method of claim 27 further including the step of applying the same polarity potential to said control electrode as previously applied and exposing only a portion of said photoconductive insulating layer above more brightly light-emitting portions of said electroluminescent material to actinic radiation whereby said output image is modified.

30. The method of claim 27 further including the step of applying the same polarity potential to said control electrode as previously applied and exposing only a portion of said photoconductive insulating layer above more brightly light-emitting portions of electroluminescent phosphor material to actinic radiation whereby charge is transferred through said photoconductive insulating layer to adjacent said interface thereby selectively erasing that portion of said output image beneath exposed areas of said photoconductive insulating layer.

References Cited

UNITED STATES PATENTS

| | | | |
|---|---|---|---|
| 2,905,830 | 9/1959 | Kazan | 250—213 |
| 2,939,029 | 5/1960 | Wahlig | 313—108 |
| 2,943,205 | 6/1960 | Kazan et al. | 250—213 X |
| 2,975,294 | 3/1961 | Kazan et al. | 250—213 |
| 3,293,441 | 12/1966 | Kazan et al. | 250—213 |
| 3,441,736 | 4/1969 | Kazan et al. | 250—213 |

WALTER STOLWEIN, Primary Examiner

U.S. Cl. X.R.

340—173